United States Patent Office 3,355,399
Patented Nov. 28, 1967

3,355,399
REINFORCEMENT OF ORGANIC LATEX POLYMERS WITH SILSESQUIOXANES
Joseph Cekada, Jr., Midland, Mich., assignor to Dow Corning Corporation, Midland, Mich., a corporation of Michigan
No Drawing. Filed Oct. 22, 1965, Ser. No. 502,379
16 Claims. (Cl. 260—3)

ABSTRACT OF THE DISCLOSURE

Organic latex polymers are reinforced with silsesquioxanes of the unit formula $RSiO_{3/2}$ wherein R is a methyl, ethyl, vinyl, phenyl or 3,3,3-trifluoropropyl radical. The silsesquioxanes have a particle size in the range of 10 to 1000 A.

---

This invention relates to the reinforcement of organic latex polymers with silsesquioxanes.

Over the past 50 years the uses of latexes of organic polymers has increased tremendously as the technology has developed in this field. The organic polymers in these latexes have varied widely in their properties and have included elastomers, plastics and resins. Because of this wide variation in properties, the latexes have found utility in such diverse fields as polishes, rubbers and rubber goods, paints and lacquers, leather treatments, textile treatments, corrosion inhibition, lubricating films, adhesives, molding compositions, release films, and many, many other fields. The absence of organic solvents, the ease of preparation, the ease of handling, and the oftentime unique characteristics of the organic latex polymers are just a few of the reasons for the steadily increasing interest in organic polymer latexes.

While organic polymer latexes have been known and in use for some time, and while their use and interest have been steadily increasing, this does not in any way mean that problems do not exist in this field. One problem encountered with the use of organic latex polymers has been the weakness or lack of strength in the polymer. It is this problem to which the instant invention is addressed, i.e., the strengthening or reinforcement of organic latex polymers.

More specifically, this invention relates to a latex comprising an organic polymer and a silsesquioxane having the unit formula $RSiO_{3/2}$ wherein R is a member selected from the group consisting of the methyl, ethyl, vinyl, phenyl and 3,3,3-trifluoropropyl radicals, said silsesquioxane having a particle size in the range of 10 to 1000 A.

This invention further relates to an organic polymer containing a silsesquioxane as defined above.

It has now been found that when a colloidal suspension of a silsesquioxane is added to an organic polymer latex, the products made from such a latex are stronger than the products made from a similar latex which does not contain the silsesquioxane. This reinforcing benefit provided by the silsesquioxane is most pronounced when the organic polymer is elastomeric. In the case of plastic and resinous materials, the reinforcing benefit of the silsesquioxane is most pronounced in films or thin sections of the polymers.

Any organic polymer which can be obtained or made in the form of a latex can be employed herein. These polymers and the preparation of latexes containing them, for example by emulsion polymerization, are well known to those skilled in the art. Many latexes of organic polymers are or have been commercially available. Examples of such latexes are natural rubber, acrylic rubbers, butadiene rubbers, acrylic copolymers, styrene copolymers, chloroprene rubbers, isobutylene rubbers, polysulfide rubbers, acrylic plastics, polyamides, polyesters, polyfluorinated plastics, styrene plastics, vinyl butyral plastics, vinyl chloride plastics, vinyl ester (polyvinyl acetate) plastics, vinylidene chloride plastics and rubber-plastic blends such as nitrile-polyvinyl chloride and nitrile-styrene acrylonitrile blends.

Further illustrations of organic polymers that are useful herein are those prepared from the monomers below. The term "organic polymer" as used herein is intended to include both homopolymers and copolymers. The copolymers can be copolymers of organic monomers and silicone monomers as well as mixtures of organic monomers. Thus organic polymers which can be used are those prepared from organic monomers which are well-known materials, are readily available, and are defined as having one or more polymerizable unsaturated carbon-to-carbon bond. Examples of such materials include vinyl, vinylidene and allyl aromatic compounds such as styrene, the vinyltoluenes, the methylstyrenes, the ethyl styrenes, the propyl styrenes, the vinyl biphenyls, the vinyl biphenyl ethers, the vinyl naphthalenes, and the like; the substituted vinyl, allyl or vinylidene aromatics including the alkyl, phenyl, alkoxy, phenoxy, acetyl, acylamino, isocyanate, carbamide, amido, amino, nitrile, carboxyamido, trifluoromethyl, phosphoro, and halo (F, Cl, Br) substitutents including the mono, di, tri and tetra substituted styrenes, methyl styrenes, ethyl styrenes, isopropyl styrenes and the like monomers; esters of olefinic acids including $\alpha$ and $\beta$ substituted olefinic acids and including alkyl, cycloalkyl, alkenyl, aryl, aralkyl esters such as the methyl, ethyl, propyl, butyl, isobutyl, pentyl, hexyl, cyclohexyl, phenyl esters of acrylic, methacrylic, ethacrylic, and the like; and including the $\alpha$-haloacrylates such as methyl $\alpha$-chloroacrylate, propyl $\alpha$-chloroacrylate and the like; the esters of olefinic alcohols with saturated acids, such as allyl, methallyl, crotyl, 1-chloroallyl, 2-chloroallyl, vinyl, methylvinyl, and the like esters of saturated aliphatic and aromatic monobasic acids as vinyl and allyl acetate, isopropenyl acetate, vinyl formate, vinyl 2-ethylhexoate, methylvinyl acetate, vinyl and allyl propionate, vinyl and allyl benzoate, and the like; the vinyl alkyl esters of olefinic dicarboxylic acids such as the vinyl alkyl esters from such alkyls as methyl, ethyl, propyl, and the like through $C_5$, of the olefinic dicarboxylic acids including maleic, citraconic, itaconic, muconic, glutaconic, fumaric and derivatives of these esters such as vinyl ethylchloromaleate and the like; olefinic acid esters of epoxy alcohols, such as glycidyl methacrylate, glycidyl acrylate, glycidyl crotonate and the reaction products of such with amines, as trimethyl amine and the like; the olefinic halides, such as vinyl fluoride, vinyl chloride, vinyl bromide, vinylidene fluoride, vinylidene chloride and the like; the alkenyl ketones such as methyl vinyl ketone, isopropenyl methyl ketone and the like; the olefinic ethers such as vinyl ethyl ether, vinyl butyl ether, vinyl cyclohexyl ether, vinyl phenyl ether, vinyl tolyl ether, vinyl benzyl ether and the like; the olefinic aldehydes such as acrolein, methacrolein, and the like; the amino olefinic ethers such as the amino vinyl ethers including aminoethylvinyl ether, aminopropylvinyl ether, N-methylaminoethylvinyl ether, N,N-diethylaminoethylvinyl ether and the like; nitrogen containing compounds such as aminocyclohexyl methacrylate, triethanolamine monomethacrylate, $\beta$-piperidyl-N-ethyl methacrylate, $\beta$-morpholine-N-ethyl methacrylate, N-methacrylyl morpholine, N-methacrylyl thiomorpholine, N-methacrylyl piperidines, N-acrylyl morpholine, N-acrylyl thiomorpholine, N-acrylyl piperidine and the like; the quaternary ammonium monomers, including methacryloxyethyltrimethylammonium methylsulfate and various quaternizing reaction products of quaternizing agents such as alkyl halides, alkyl sulfonates, alkyl phosphates and the like (e.g. methyl bromide and toluene sulfonate) with tertiary amine monomers such as β-dimethylaminoethyl methacrylate, methyl-α-diethyl aminoacrylate, methyl α-(N-methylanilino)-acrylate, methyl α-dibenzylaminoacrylate, methyl α-distearyl amino acrylate and the like; the monoolefinic triazine monomers including triazine monomers in which one of the carbons of the triazine ring is attached to a vinyl, allyl radical or the like and the other carbons of the triazine are attached to cyano, halo (F, Cl, Br), amino, alkoxy, cycloaliphatic (e.g. cyclopentyl, cyclohexyl, etc.) aromatic-substituted (e.g. phenyl, biphenyl, naphthyl, etc.) alkylaryl (e.g. tolyl, xylyl, ethylphenyl, etc.) halogenated aromatic and the like; the N-vinyl-N-alkylguanidines such as N-vinyl-N-n-butylguanidine, N-vinyl-N-benzyl guanidine, acryloguanamine, methacryloguanamine and the like; the N-vinyl monomers such as N-vinylpyrrole, N-vinyl carbazole, N-vinylindole, N-vinyl succinimide and the like; N-vinyl lactams such as N-vinyl caprolactam, N-vinyl butyrolactam and the like; the amides and substituted amides of acrylic acid and α- and β-substituted acrylic acids such as acrylamide, methacrylamide, ethacrylamide, N-methylacrylamide, N-methylmethacrylamide, N,N-bis(hydroxyethyl)acrylamide, N,N-diethylacrylamide, N,N-ethylmethylacrylamide and other mono- and di-N-substituted unsaturated acid amides where the substituent is alkyl $C_1$ to $C_5$ alkyl, alkoxy, haloalkyl and the like; the olefinic nitriles such as acrylonitrile, methacrylonitrile, ethacrylonitrile, chloroacrylonitrile and the like; the fluoro-substituted amides of olefinic acids such as N-(2,2,3-trifluoromethyl)acrylamide, methacrylamide, N-(2,2-difluoroethyl)acrylamide and methacrylamide; the acylamino substituted acrylic and α- and β-acrylic acid esters such as the methyl, ethyl, propyl and the like alkyl esters of α-acetoaminoacrylate, α-N-butyraminoacrylate and the like; the vinyl pyridines such as 2-vinylpyridine, 3-vinylpyridine, 2-vinyl-5-ethyl pyridine, 2-methyl-5-vinylpyridine and the other ethyl and methyl isomers of vinylpyridine and the like; the vinyl heterocylic compounds such as 2-vinylfuran and 2-vinylthiophene and the like; the phosphorus containing monomer such as acrylic esters containing phosphonamido groups such as diamidophosphoroacrylate and the like and other similar polymerizable materials having a polymerizable unsaturated carbon-to-carbon bond.

The conjugated dienes include the following: hydrocarbon conjugated dienes such as butadiene-1,3, isoprene, 2,3-dimethylbutadiene-1,4, piperylene, pentadiene-1,3,2-phenylbutadiene-1,3, and the like; the polar conjugated dienes such as 1- and 2-cyanobutadiene, 1,3,2-chlorobutadiene-1,3 and the like.

Monomer material having a plurality of polymerizable unsaturated carbon-to-carbon bonds at least two of which are non-conjugated, and include: The polyunsaturated esters of olefinic alcohols and unsaturated monocarboxylic acids such as the vinyl, vinylidene, and allyl esters of unsaturated monocarboxylic acids such as vinyl acrylate, allyl acrylate, the vinyl and allyl esters of α- and β-substituted acrylates such as vinyl methacrylate, vinyl crotonate, vinyl ethacrylate, allyl methacrylate, allyl ethacrylate, vinyl α-chloroacrylate, allyl α-hydroxyethyl acrylate, and the like; the polyunsaturated esters of saturated dicarboxylic and polycarboxylic acids such as the vinyl, vinylidene, allyl esters and mixed esters of such dicarboxylic acids as oxalic, malonic, succinic, glutaric, adipic, tartaric, citric, and the like; polyunsaturated esters of unsaturated polycarboxylic acids, such as the vinyl, vinylidene, and allyl esters and mixed esters of the unsaturated polycarboxylic acids such as maleic, citraconic, itaconic, mesaconic, fumaric, muconic, chloromaleic, aconitic and the like including such monomers as diallyl fumarate, diallyl homophthalate, diallyl itaconic, diallyl ester of muconic acid, diallyl maleate, diallyl phthalate, diallyl isophthalate, diallyl terephthalate, and the like; polyhydroxy esters of unsaturated acids such as the glycol esters, glycol ether esters, the trihydroxy-, tetrahydroxy-, pentahydroxy-, hexahydroxy-esters including the glycerides, the pentoses, the hexose esters of acrylic acid and α- and β-substituted acrylic acid such as ethylene diacrylate, ethylene dimethacrylate, propylene dimethacrylate, glycerol dimethacrylate, glyceryl trimethacrylate, tetramethylene diacrylate and dimethacrylate, tetraethylene glycol dimethacrylate and the like; polyunsaturated acid amides such as N,N-diallyl acrylamide, N,N-diallyl methacrylamide, N,N-methylene bisacrylamide and the like; polyunsaturated ethers such as divinyl ether, diallyl ether, divinyl carbitol, divinyl ether of diethylene glycol and the like; polyunsaturated triazines, the diallyl cyanurates, triallyl cyanurate, the di- and tri-vinyl cyanurates and derivatives of these and the like; the polyalkene aryl compounds and derivatives including the polyvinyl-, polyvinylidene- and polyallyl aryl compounds, such as divinyl benzene, trivinyl benzene, divinyl toluene, trivinyl toluene, divinyl xylene, divinyl ethyl benzene, divinyl biphenyl and divinyl biphenyl oxide, divinylnaphthalenes, divinyl methylnaphthalenes, and derivatives of these including those with alkyl, alkoxy, phenoxy, acetyl, isocyano, amino, nitrile, trifluoro methyl, and halo (F, Cl, Br) groups and the like; and other monomers containing a plurality of vinyl, vinylidene, allyl, alkenyl and other polymerizable unsaturated double and triple bonds.

The silsesquioxanes employed herein are those having the unit formula $RSiO_{3/2}$ wherein R is a member selected from the group consisting of the methyl, ethyl, vinyl, phenyl and 3,3,3-trifluoropropyl radicals, said silsesquioxane having a particle size in the range of 10 to 1000 A. While the particle size of the silsesquioxane can range from 10 to 1000 A. it is preferably in the range of 50 to 500 A.

The amount of silsesquioxane employed in the latex can vary widely and will be determined by the ultimate properties desired in the product. Generally speaking, however, between 10 and 200 parts (preferably 20–100) of silsesquioxane per 100 parts of organic polymer will be employed.

The silsesquioxanes employed herein can be prepared, for example, by adding a silane of the formula $RSi(OR'')_3$ to a water-surfactant mixture, with agitation under acidic or basic conditions. In order to obtain silsesquioxanes of the desired particle size, the amount of silane added must be less than 10 percent based on the combined weights of the silane, water and surfactant. The exact amount of silane that can be added depends on the substituent R. For example, when R is a methyl radical, about 10 percent can be added, when R is a phenyl radical, about 4 percent can be added, and when R is a propyl radical, about 8 percent can be added. When it is desirable to use a greater amount of silane, it is essential that the silane be added at a rate of less than one mole of silane per hour. Even at this slow rate of addition it is not possible to increase the amount of silane to more than about 35 percent based on the combined weights of the silane, water and surfactant, and again the exact amount will depend on substituent R. For a complete disclosure on the silsesquioxanes and the above methods for preparing them, attention is directed to abandoned U.S. patent application Ser. No. 427,077, filed Jan. 21, 1965 by Cekada and Weyenberg, the disclosure of which is incorporated herein by reference.

In the hydroylzable portion of the silanes used to prepare the silsesquioxane, the R'' group can be a hydrogen atom, an alkyl group containing 1 to 4 carbon atoms such as the methyl, ethyl, propyl, isopropyl or butyl group, or R'' can be an acetoxy,

$-CH_2CH_2OH$, $-CH_2CH_2OCH_3$ or a $-CH_2CH_2OC_2H_5$ group. Preferably, R″ is a methyl or an ethyl group, that is to say, it is preferred to use methoxy or ethoxy silanes in preparing the silsesquioxanes.

The silsesquioxanes can be added to the latexes of this invention in the form of colloidal suspensions, as they are prepared. Copolymers and blends of the silsesquioxanes can be employed in the latexes as well as the individual ones and the formula $RSiO_{3/2}$ is intended to include such materials. It is preferred that the colloidal suspensions be neutral when used in the latexes. It has been found that in some instances that when some of the volatiles (water and alcohol) have been stripped from the silsesquioxane suspensions to produce a highly viscous pseudo-gel, that the cured product obtained when such a gel is used in the latex is much stronger than the product obtained from the silsesquioxane as prepared.

In addition to the organic polymer and the silsesquioxane, other conventional or obvious additives can be used in these latexes. Examples of such materials are pigments, fillers, heat stabilizers, cross-linking agents and catalysts.

Now in order that those skilled in the art may better understand how the present invention can be practiced, the following examples are given by way of illustration and not by way of limitation.

*Example 1*

40 g. of a polyethylacrylate latex containing 8.8% polymer solids, and 40 g. of a colloidal suspension of $CH_3SiO_{3/2}$ containing 5.5% silsesquioxane solids (the particle size of the silsesquioxane being 125 A.) were mixed. A film was cast from the resulting latex at room temperature and allowed to dry for 4 days. A film was also cast for purposes of comparison from an identical polyethylacrylate latex which had nothing blended therewith. The elastomeric polyethylacrylate film reinforced with the silsesquioxane was considerably stronger than the unreinforced elastomeric polyethylacrylate film.

*Example 2*

143 g. of a styrene-butadiene latex containing 70% polymer solids, and 145 g. of a colloidal suspension of $CH_3SiO_{3/2}$ containing 13.8% silsesquioxane solids (the particle size of the silsesquioxane being less than about 200 A.) were mixed. A film was cast from the resulting latex at room temperature and allowed to dry. A film was also cast for purposes of comparison from an identical styrene-butadiene latex which had nothing blended therewith. The durometer (D), tensile strength (T) and percent elongation (E) of each of the rubbery films was measured. The measured properties of the films are set forth in the table below:

|  | D | T | E |
|---|---|---|---|
| Polymer only | 42 | 180 | 160 |
| Polymer and silsesquioxane | 72 | 350 | 325 |

*Example 3*

When the latexes below are substituted for those of the previous examples, similar results are obtained.
(A) Polyethylmethacrylate
(B) Polystyrene
(C) Polysulfide
(D) Polyvinylchloride
(E) Polychloroprene
(F) A methylmethacrylate-dimethylsiloxane copolymer.

*Example 4*

When 10 to 200 parts of the silsesquioxanes below, having particle sizes in the range of 10 to 1000 A., are substituted for the methylsilsesquioxane of the previous examples, similar results are obtained.
(A) $C_2H_5SiO_{3/2}$
(B) $CH_2{=}CHSiO_{3/2}$
(C) $C_6H_5SiO_{3/2}$
(D) $CF_3CH_2CH_2SiO_{3/2}$
(E) Copolymer of $CH_3SiO_{3/2}$ and $C_6H_5SiO_{3/2}$
(F) Mixture of $CH_3SiO_{3/2}$ and $C_2H_5SiO_{3/2}$.

That which is claimed is:

1. A latex of an organic polymer containing as a reinforcing agent a silsesquioxane having the unit formula $RSiO_{3/2}$ wherein R is a member selected from the group consisting of the methyl, ethyl, vinyl, phenyl and 3,3,3-trifluoropropyl radicals, said silsesquioxane having a particle size in the range of 10 to 1000 A.

2. The latex of claim 1 wherein the organic polymer is elastomeric and the silsesquioxane has a particle size in the range of 50 to 500 A.

3. The latex of claim 2 wherein the organic polymer is natural rubber.

4. The latex of claim 2 wherein the organic polymer is an acrylate polymer.

5. The latex of claim 4 wherein the organic polymer is an ethylacrylate polymer and R is a methyl radical.

6. The latex of claim 2 wherein the organic polymer is a styrene-butadiene polymer.

7. The latex of claim 2 wherein the organic polymer is a polysulfide polymer.

8. The latex of claim 1 wherein the organic polymer is a styrene polymer.

9. A composition of an organic polymer containing as a reinforcing agent a silsesquioxane having the unit formula $RSiO_{3/2}$ wherein R is a member selected from the group consisting of the methyl, ethyl, vinyl, phenyl and 3,3,3-trifluoropropyl radicals, said silsesquioxane having a particle size in the range of 10 to 1000 A.

10. The composition of claim 9 wherein the organic polymer is elastomeric and the silsesquioxane has a particle size in the range of 50 to 500 A.

11. The composition of claim 10 wherein the organic polymer is natural rubber.

12. The composition of claim 10 wherein the organic polymer is an acrylate polymer.

13. The composition of claim 12 wherein the organic polymer is an ethylacrylate polymer and R is a methyl radical.

14. The composition of claim 10 wherein the organic polymer is a styrene-butadiene polymer.

15. The composition of claim 10 wherein the organic polymer is a polysulfide polymer.

16. The composition of claim 9 wherein the organic polymer is a styrene polymer.

References Cited

UNITED STATES PATENTS

| 3,170,890 | 2/1965 | Boyd et al. | 260—824 |
| 3,294,738 | 12/1966 | Krantz | 260—29.2 |
| 2,833,732 | 5/1958 | Weyer | 260—827 |
| 2,884,388 | 4/1959 | Hedlund | 260—827 |

FOREIGN PATENTS 978,484  12/1964  Great Britain.

MURRAY TILLMAN, *Primary Examiner.*

M. J. TULLY, *Assistant Examiner.*